United States Patent [19]
Gee et al.

[11] Patent Number: 5,522,250
[45] Date of Patent: Jun. 4, 1996

[54] AGED EXHAUST GAS OXYGEN SENSOR SIMULATOR

[75] Inventors: Thomas S. Gee, Canton; Edward L. Korte, Dearborn Heights; Thomas A. Schubert, Novi, all of Mich.

[73] Assignee: Ford Motor Company, Dearborn, Mich.

[21] Appl. No.: 418,227

[22] Filed: Apr. 6, 1995

[51] Int. Cl.⁶ .......................... F02M 65/00; G01D 18/00
[52] U.S. Cl. .......................... 73/1 G; 73/118.1; 73/866.4
[58] Field of Search .................................. 73/1 G, 866.4, 73/118.1

[56] References Cited

U.S. PATENT DOCUMENTS

| | | | |
|---|---|---|---|
| 3,903,853 | 9/1975 | Kizler et al. | 123/688 |
| 4,463,594 | 8/1984 | Raff et al. | 73/23.21 |
| 4,562,729 | 1/1986 | Maloney | 73/118.1 |
| 5,020,499 | 6/1991 | Kojima et al. | 123/479 |
| 5,214,915 | 6/1993 | Schneider et al. | 73/118.1 X |
| 5,357,791 | 10/1994 | Gee et al. | 73/118.1 |
| 5,396,794 | 3/1995 | Nichols | 73/118.1 |
| 5,423,203 | 6/1995 | Namiki et al. | 73/118.1 X |

FOREIGN PATENT DOCUMENTS

| | | | |
|---|---|---|---|
| 3634873 | 4/1987 | Germany | 73/1 G |
| 4122702 | 1/1992 | Germany | 73/118.1 |
| 5789 | 1/1979 | Japan | 73/1 G |
| 139796 | 10/1979 | Japan | 73/118.1 |
| 160747 | 9/1984 | Japan | 73/1 G |

OTHER PUBLICATIONS

*Patent Abstracts of Japan* Grp. p933, vol. 13, No. 422 Abs Pub Date Sep. 20, 1989 (01–155257) "Evaluating Method of Exhaust Gas Sensor for Engine".

Primary Examiner—Thomas P. Noland
Attorney, Agent, or Firm—Peter Abolins; Roger L. May

[57] ABSTRACT

An aged exhaust gas oxygen sensor (EGO) simulator is inserted between an exhaust gas oxygen sensor and an electronic control module for testing the response of fuel control and emission systems to various amounts of exhaust gas oxygen sensor aging/degrading. The sensor signal is input to a summing amplifier where a delay signal is added. Positive and negative summing amplifier outputs go through vernier and decade controls, which add delay, and then to a variable gain inverter. The difference signal is integrated and output to the summing amplifier as the delay signal and output to a ground offset control for shifting the waveform up and down before going out to the control module. The vernier and decade controls add delays to mimic an aged/degraded exhaust gas oxygen sensor.

16 Claims, 2 Drawing Sheets

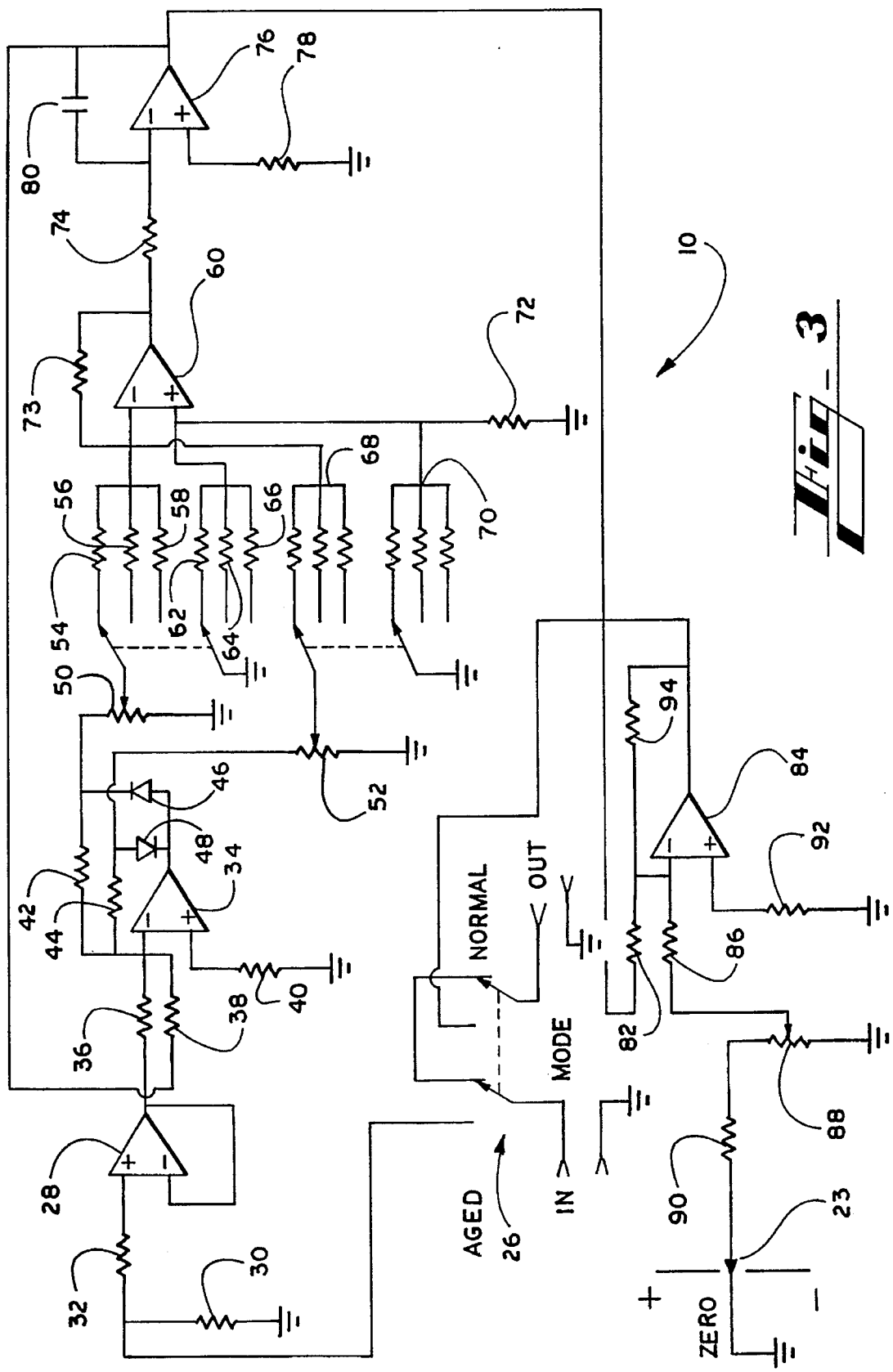

AGED EXHAUST GAS OXYGEN SENSOR SIMULATOR

FIELD OF THE INVENTION

The present invention relates generally to an exhaust gas oxygen sensor (EGO), and, more particularly, to a device for testing the response of fuel control and emission systems to various levels of EGO aging.

BACKGROUND OF THE INVENTION

Modern vehicles must control exhaust emissions to meet air quality standards. An exhaust gas oxygen sensor monitors exhaust emissions and inputs exhaust data to an electronic control module that can vary the fuel/air mixture to help keep emissions within the required parameters. As an exhaust gas oxygen sensor ages, its output varies causing exhaust emissions to rise, sometimes above a target level. It is desirable to have a tool for development and production calibration of the electronic control module to identify the exhaust gas oxygen sensor threshold signal degradation that will cause exhaust emissions to exceed the target level. Accordingly, it will be appreciated that it would be highly desirable to have a tool that would mimic the signal of an aged or otherwise degraded exhaust gas oxygen sensor.

SUMMARY OF THE INVENTION

The present invention is directed to overcoming one or more of the problems set forth above. Briefly summarized, according to one aspect of the present invention, an aged exhaust gas oxygen sensor simulator is inserted between an exhaust gas oxygen sensor and an electronic control module for testing the response of fuel control and emission systems to various levels of exhaust gas oxygen sensor aging. The simulator comprises input means for receiving a sensor signal from the exhaust gas oxygen sensor, a summing amplifier adding the sensor signal and a delay signal and producing a summed signal at its output, a variable gain inverter having an input and an output, a first control means connecting the summing amplifier output to the variable gain inverter input for simulating a rich to lean transition, a second control means connecting the summing amplifier output to the variable gain inverter input for simulating a lean to rich transition, and an integrator receiving the variable gain inverter output and delivering the delay signal to the summing amplifier and the electronic control module.

The simulator adds delays to the exhaust gas oxygen sensor signal to mimic transitions of the air/fuel mixture from rich to lean and from lean to rich. A feedback signal is summed with the sensor signal to produce a delayed signal output which mimics an aged or degraded sensor. The simulator includes an impedance matching network to prevent distortion of the sensor signal when the simulator box is connected.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 is a schematic diagram of the simulator of FIG. 1.

DETAILED DESCRIPTION OF THE PREFERRED EMBODIMENTS

Figure 1:
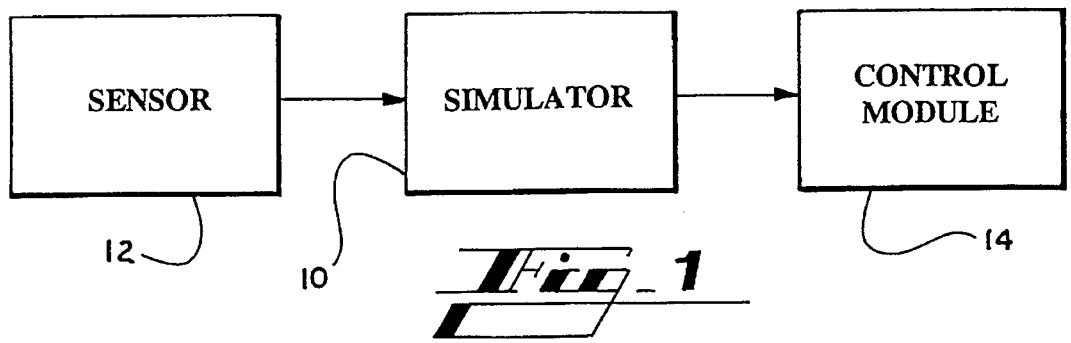
FIG. 1 is a block diagram of a preferred embodiment of a simulator box connected in series with an exhaust gas oxygen sensor and a control module according to the present invention.
Figure 2:
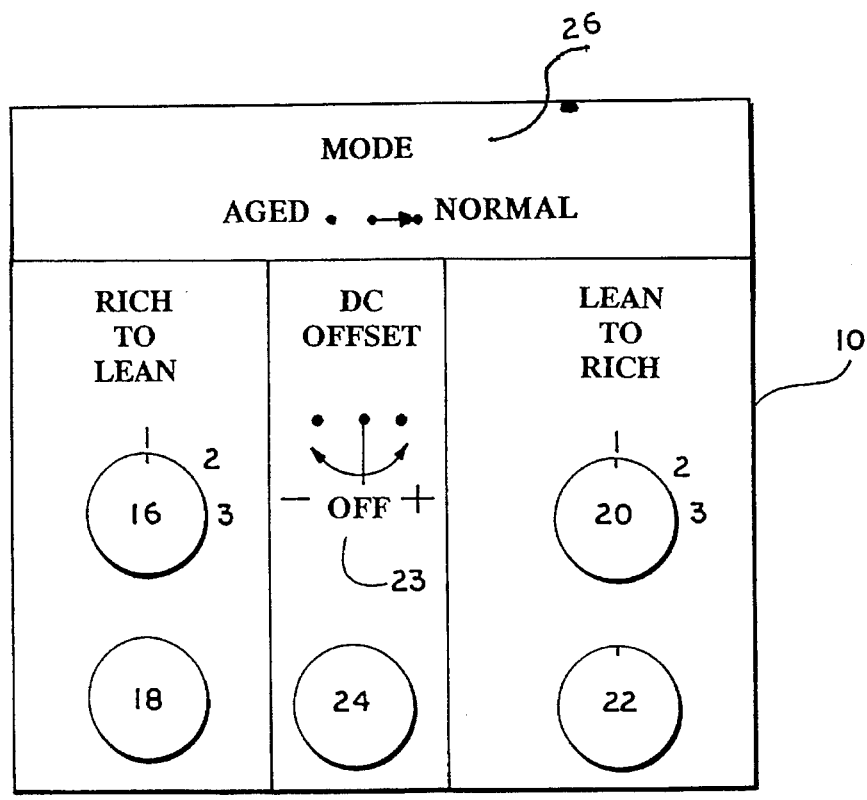
FIG. 2 is a front view of the simulator box illustrating decade and vernier control knobs.

Referring to FIGS. 1–2, an exhaust gas oxygen sensor signal simulator delay box 10 is inserted in series between an exhaust gas oxygen sensor (EGO) 12 and a control module 14 to mimic the characteristics of aged or degraded EGO sensors. The front panel of the simulator box 10 is divided into three sections with the left section having decade and vernier control knobs 16, 18 for controlling rich to lean fuel mixture transitions. A right hand section has decade and vernier control knobs 20, 22 controlling lean to rich fuel mixture transitions, and a center section has a control switch 23 and a ground offset vernier control knob 24. For the present invention, the decade control knobs 16, 20 have three active positions.

Referring to FIGS. 1, 2 and 4, the simulator 10 includes a mode switch 26, preferably located on the front panel of the box, that, in a normal mode, electrically removes the simulator and, in an aged mode, inserts the simulator between the sensor 12 and control module 14. Thus, in the normal mode, a sensor signal from the exhaust gas sensor 12 is routed directly to the control module 14. In the aged mode, the sensor signal is input to an operational amplifier 28 configured as a unity gain follower with resistors 30, 32 connected between ground and the noninverting input of the amplifier 28. The sensor signal is input at the junction of the connected resistors 30, 32. Amplifier 28 and resistors 30, 32 match the impedance sensor 12 would see if connected to the control module 14 thereby acting as a buffer to prevent distortion of the input signal.

The output of amplifier 28 is connected to the inverting input of operational amplifier 34 through resistor 36. A delay signal is also input to the inverting input of amplifier 34 through resistor 38. The noninverting input of amplifier is grounded through resistor 40. Feedback resistors 42, 44 are also connected to the inverting input of amplifier 34 while the output of amplifier 34 is connected through diode 46 to resistor 42 and through diode 48 to resistor 44. Diodes 46, 48 are connected with opposing polarities to the output of amplifier 34 so that when amplifier 34 functions as a summing amplifier its inputs through resistors 36 and 38 are summed so that a positive output causes diode 46 to conduct producing a voltage across potentiometer 50, on the other hand, a negative output causes diode 48 to conduct creating a voltage drop across potentiometer 52.

Potentiometer 50 is preferably a wire wound resistor with a movable tap for adjusting effective resistance. The tap is moved by turning the vernier control knob 18. Similarly, potentiometer 52 has a tap that is moved by turning the vernier control knob 22. The tap on potentiometer 50 connects potentiometer 50 to resistors 54, 56 and 58 which, in turn, are connected to the inverting input of operational amplifier 60. Selection of one of the resistors 54, 56, 58 is accomplished by turning decade resistor knob 16 to the 1, 2 or 3 position. Values of the resistors are in powers of ten so that the second resistor 56 is ten times the value of the first resistor 54, and the third resistor 58 is ten times the value of the second resistor 56 and a hundred times the value of the first resistor 54. A resistance network contains resistors 62, 64 and 66 connected in parallel to the noninverting input of amplifier 60. The values of the resistors 62, 64, 66 are the same the values of the resistors 54, 56 and 58, respectively. Selection of one the resistors from among the network is accomplished by turning decade resistor knob 16 to position 1, 2 or 3. Position 1 selects resistor 62 along with resistor 54 while position 3 selects resistor 66 along with resistor 58.

Resistance network 68 is identical to the resistance network containing resistors 54, 56 and 58 and connects the tap for potentiometer 52 to the inverting input of amplifier 60. Resistance network 70 contains resistors the same as resistors 62, 64 and 66 that are selected in the same manner except that decade resistor knob 20 is turned to select from among resistors in network 70. Resistor 72 is grounded on one end and connected to the noninverting input of amplifier 60 along with resistance network 70 and one of the resistors 62, 64 or 66. Feedback resistor 73 completes the circuit in which amplifier 60 is configured as a variable gain inverter.

There are two sets of controls for the simulator, one set for rich to lean transitions and one set for lean to rich transitions. To allow for independent delays of 1 ms to 1250 ms, each control set has two controls, a decade switch for which only the 1, 2, and 3 settings are used, and a vernier control which is adjusted from 0.0 to 0.92. The relationship between $\tau$ in milliseconds and the decade (D) and vernier settings ($\alpha$) is $$\tau = \frac{10^{(D-1)}}{1-\alpha},$$

with values as indicated in the following table 1.

TABLE 1

| Decade Setting | Vernier Setting | Milliseconds |
|---|---|---|
| D | $\alpha$ | $\tau$ |
| 1 | 0→0.92 | 1→12.5 |
| 2 | 0→0.92 | 10→125 |
| 3 | 0→0.92 | 100→1250 |

The output from amplifier 60 is input through resistor 74 to the inverting input of operational amplifier 76. Resistor 78 is connected between the noninverting input of amplifier 76 and ground. A capacitor 80 is connected to the inverting input and output of amplifier 76 thereby configuring it as an integrator. The output from integrating amplifier 76 is input through resistor 38 to the inverting input of amplifier 34 to be summed with the output of input amplifier 28.

The output of integrating amplifier 76 is input through resistor 82 to the inverting input of amplifier 84 which is configured as a summing amplifier. Also connected to the inverting input, to be summed with the input to resistor 82, is an input to resistor 86. Resistor 86 is also connected to the tap of potentiometer 88 that has one end grounded to provide a ground offset signal to shift the waveform up and down within a −1 v to +1 v window. The other end of potentiometer 88 is connected through resistor 90 to switch 23 that can switch between a ground position and positive and negative supply voltages to simulate an exhaust gas oxygen sensor failure. Grounded resistor 92 is connected the noninverting input of summing amplifier 84. A feedback resistor 94 is connected between the summing input and output of amplifier 84. The output of amplifier 84 goes out to mode switch 26, which, in the aged mode, delivers the output to the control module 14.

Operation of the present invention is believed to be apparent from the foregoing description and drawings, but a few words will be added for emphasis. The electronic simulator box is capable of independently slowing the rich to lean and lean to rich response rates of the sensor signal. Vernier control potentiometer 50 and decade control resistors 54, 56 and 58 slow the rich to lean response rate, while vernier control potentiometer 52 and decade control resistor network 68 slow the lean to rich response rate. Rich to lean transitions are identified from the trailing edge of the sensor signal waveform and lean to rich transitions by the leading edge.

HEGO is an acronym for heated exhaust gas oxygen sensor and has a normal signal level of 0 v to +1 v. A HEGO produces a high output for a rich exhaust air/fuel (A/F) ratio and a low output for a lean exhaust A/F ratio. One common mode of HEGO failure is a uniform shift in signal voltage transfer function in the negative direction, called characteristic shift downward (CSD) as is known in the art. CSD causes the HEGO's lean voltage to be as low as −1 v and the rich voltage to be as low as 0 v. The ground offset control of the aged exhaust gas oxygen sensor simulator box is used to shift HEGO waveform up and down within this −1 v to +1 v window, thus simulating a CSD failure mode or correcting the waveform of a HEGO which is experiencing CSD.

It can now be appreciated that there has been presented a simulator which slows the lean to rich and/or rich to lean response rates of the exhaust gas oxygen sensor feedback signal independently from 1 to 1250 ms. This introduces shifts in the fuel control system away from stoichiometry, causing $NO_x$, CO and HC emissions to change. The simulator box is wired in series between the exhaust gas oxygen sensor and the electronic control module. The sensor signal is modified by varying the response rate and/or by imparting a DC ground offset. There are two sets of controls (vernier pot and decade resistance switch) which independently vary the lean to rich and rich to lean response rates and a third set of controls (vernier pot and polarity switch) for varying the ground offset. A switch allows bypassing of the device completely.

While the invention has been described with particular reference to an automobile fuel and emission system, it is apparent that the simulator is easily adapted to other fuel and emission systems. As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An aged exhaust gas oxygen sensor simulator for inserting between an exhaust gas oxygen sensor and an electronic control module for testing the response of fuel control and emission systems to various levels of exhaust gas oxygen sensor degrading, comprising:

input means for receiving a sensor signal from said exhaust gas oxygen sensor;

a summing amplifier adding said sensor signal and a delay signal and producing a summed signal at its output a variable gain inverter having an inverting input, a noninverting input and an output;

a first control means connecting said summing amplifier output to said variable gain inverter inverting input for simulating a rich to lean transition a second control means connecting said summing amplifier output to said variable gain inverter input for simulating a lean to rich transition; and an integrator receiving said variable gain inverter output and delivering said delay signal to said summing amplifier and said electronic control module.

2. A simulator, as set forth in claim 1, wherein said first control means includes:

first, second and third resistors connected in parallel to said inverting input of said variable gain inverter; and a switch for selectively connecting one of said first, second and third resistors to said summing amplifier.

3. A simulator, as set forth in claim 2, wherein said second resistor has a resistance value on the order of ten times greater than a resistance value of said first resistor, and said third resistor has a resistance value on the order of ten times greater than the resistance value of said second resistor.

4. A simulator, as set forth in claim 2, including fourth, fifth and sixth resistors connected in parallel to said noninverting input of said variable gain inverter, said switch grounding one of said fourth, fifth and sixth resistors in gang operation with a respective one of said first, second and third resistors.

5. A simulator, as set forth in claim 4, wherein said fourth, fifth and sixth resistors have resistance values equal to the resistance values of said first, second and third resistor, respectively.

6. A simulator, as set forth in claim 1, wherein said first control means includes:

a potentiometer having a tap coupled to said variable gain inverter.

7. A simulator, as set forth in claim 1, wherein said first control means includes:

first, second and third resistors connected in parallel to said inverting input of said variable gain inverter;

a potentiometer between said summing amplifier and ground and having a tap; and a switch selectively connecting one of said first, second and third resistors to said tap.

8. A simulator, as set forth in claim 1, including a bypass switch for electrically removing said simulator from between said exhaust gas oxygen sensor and said electronic control module.

9. A simulator, as set forth in claim 1, including:

means for producing a ground offset signal; and a second summing amplifier adding said delay signal and said ground offset signal and producing a summed output signal that mimics a degraded exhaust gas oxygen sensor.

10. A simulator, as set forth in claim 9, wherein said means for producing a ground offset signal includes a switch operable to simulate an exhaust gas oxygen sensor failure.

11. A simulator, as set forth in claim 9, wherein said means for producing a ground offset signal includes a potentiometer having a tap coupled to said second summing amplifier.

12. A simulator, as set forth in claim 1 wherein said input means matches an impedance said exhaust gas oxygen sensor signal encounters when said exhaust gas oxygen sensor is connected directly to said electronic control module to thereby prevent distortion of said sensor signal.

13. A device for simulating characteristics of a degraded exhaust gas oxygen sensor (EGO) for testing the response of fuel control and emission systems to various levels of EGO degrading, said EGO producing a sensor signal having lean-to-rich and rich-to-lean response rates, said device comprising:

input means for matching impedances of said EGO and said device and preventing distortion of said sensor signal, said input means outputting a conditioned sensor signal;

first means for adding said conditioned sensor signal and a delay signal and producing a summed signal;

a variable gain inverter having an inverting input and an output;

a first control means coupling said summed signal from said adding means to said inverting input of said variable gain inverter for adjusting said lean-to-rich and rich-to-lean response rates;

a second control means connected to said adding means and said first control means for adjusting said lean-to-rich and rich-to-lean response rates; and an integrator connected to said output of said variable gain inverter and outputting said delay signal having lean-to-rich and rich-to-lean response rates simulating characteristics of a degraded EGO.

14. A device, as set forth in claim 13, including:

means for producing a ground offset signal; and second means for adding said delay signal and said ground offset signal and producing a summed output signal having a leading edge and a trailing edge simulating characteristics of a degraded EGO.

15. A device, as set forth in claim 14, including a switch operable to simulate an EGO failure.

16. A device, as set forth in claim 13, wherein said device receives an input signal from said EGO and delivers an output signal, and including a bypass switch for electrically isolating said device so that said input signal from said EGO is the output signal.

* * * * *